United States Patent [19]

Kawagoshi et al.

[11] 3,978,005

[45] Aug. 31, 1976

[54] CATALYST FOR CONTACT REDUCTION OF NOx IN ENGINE EXHAUST GASES AND METHOD OF PRODUCING SAME

[75] Inventors: Sakae Kawagoshi, Yokohama; Muneyuki Kubo, Yokosuka, both of Japan

[73] Assignee: Nissan Motor Co., Ltd., Japan

[22] Filed: July 29, 1974

[21] Appl. No.: 492,765

[30] Foreign Application Priority Data
Aug. 1, 1973 Japan.................................. 48-85787

[52] U.S. Cl................................. 252/470; 252/474; 423/213.5
[51] Int. Cl.²...................... B01J 23/72; B01J 23/76
[58] Field of Search........................... 252/474, 470; 423/213.5; 204/44; 427/383

[56] References Cited
UNITED STATES PATENTS 3,773,894   11/1973   Bernstein et al................. 252/474 X
3,849,342   11/1974   Santala .......................... 252/474 X FOREIGN PATENTS OR APPLICATIONS
1,103,315   2/1968   United Kingdom.................. 204/44

OTHER PUBLICATIONS

Sarojamma et al., Electrodeposition of Ternary Alloys of Cobalt–Nickel–Copper from the Pyrophosphate Bath, *Plating*, pp. 619–625, June 1970.

*Primary Examiner*—W. J. Shine
*Attorney, Agent, or Firm*—Robert E. Burns; Emmanuel J. Lobato; Bruce L. Adams

[57] ABSTRACT

A catalytic alloy composed of 60–95% Ni, 2.5–20% Cu and 2.5–20% Co is electrodeposited on a carrier. The plating bath is an aqueous solution of the sulfates of the alloy component metals, containing a complexing agent such as Rochell salt to cause deposition potentials of the metals to fall in a common range.

3 Claims, 7 Drawing Figures

CATALYST FOR CONTACT REDUCTION OF NOX IN ENGINE EXHAUST GASES AND METHOD OF PRODUCING SAME

The present invention generally relates to a catalyst for contact reduction of nitrogen oxides and more particularly to a catalyst comprising a catalytic alloy composed of nickel, copper and cobalt which is especially suitable for reduction of nitrogen oxides in engine exhaust gases, and to a method of producing the same.

Elimination of oxides of nitrogen (NO$x$) existing in exhaust gases from conventional internal combustion engines has been eagerly studied with unsatisfactory results until now. There is still a considerable gap between the state of the art and the expected goal, which is the removal of NO$x$ in current automobile engine exhaust gases by more than 90 percent.

Catalytic reduction of NO$x$ has been of great interest, and nickel-copper alloys have been proposed as promising catalytic material for contact reduction of NO$x$. A catalyst for use in an engine exhaust system is required to have a long life at high temperatures since it is usually exposed to exhaust gases at temperatures approximately ranging from 600° to 900°C and sometimes even beyond such a range. A nickel-copper system, however, cannot retain its catalytic action at such high temperatures for a period long enough to be practical for prolonged engine operation.

It is therefore an object of the present invention to provide a catalyst for contact reduction of NO$x$ in engine exhaust gases which retains strong catalytic action for a long period at high temperatures.

It is another object of the invention to provide a practicable method of producing such a catalyst.

According to the invention, a catalyst comprises a conventional carrier made of a heat and corrosion-resistant metal and a coating of a catalytic alloy deposited on the carrier, the catalytic alloy being composed of 60 to 95% by weight nickel, 2.5 to 20% copper and 2.5 to 20% cobalt.

The catalyst is produced by electrodeposition of the catalytic alloy on the carrier from an aqueous solution containing sulfates of nickel, copper and cobalt and a complexing agent selected from potassium sodium tartrate, citric acid and ethylenediamine-tetraacetic acid.

The introduction of cobalt into a nickel-copper system has a surprising effect on prolongation of the catalytic action of the system, and the existence of the complexing agent in the above plating bath causes the deposition potentials of the alloy component metals to fall in a common range.

The invention will become more clear from the following detailed description taken with the accompanying drawings, in which.

The present invention is based on the discovery that a nickel-copper-cobalt alloy of a specific composition range shows catalytic action on NO$x$ as strong as and far more long lasting even at high temperatures than that of a nickel-copper alloy. Variations of the alloy composition within the range as specified in the above summary of the invention have little influence on the strength and endurance of the catalytic action. If, however, the nickel content is less than 60% by weight, heat-resistance of the alloy becomes unsatisfactory. Increase in the amount of either copper or cobalt above 20% by weight results in the same. On the other hand, the catalytic action is reduced if the nickel content exceeds 95% by weight or the amount of either copper or cobalt is less than 2.5 percent.

Figure 1:
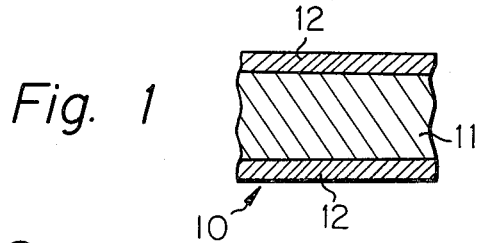
FIG. 1 is a partial sectional view of a catalyst according to the invention.

Referring to FIG. 1, a catalyst 10 of the invention essentially consists of a carrier 11 and layers 12 of the above described Ni-Cu-Co alloy deposited on the carrier 11. The carrier 11 is made of a heat and corrosion-resistant metal, which may be selected from conventional carrier materials such as stainless steel, Inconel (Ni-Cr alloys), Incoloy (Ni-Fe-Cr alloys), etc. There is no specific limitation to the shape and structure of the carrier 11, and the catalyst 10 of the invention may be designed in various ways like conventional catalysts for contact reduction or oxidation. For example, a metal net may be used as the carrier 11, and the net is rolled up to a tubular form after coated with the catalytic alloy 12. The alloy layer 12 may be deposited only on one surface of the carrier 11 if desired.

To obtain a Ni-Cu-Co alloy free from segregation of any component, the alloy layer 12 is preferably formed by electroplating of the carrier 11.

As is well known, it is necesary for electrodeposition of an alloy that deposition potentials of the respective alloy components are close to each other. However, nickel, copper and cobalt have respective deposition potentials considerably different from each other when a sulfate bath, which is preferred in the present invention, is used. The potential values are presented in Table 1.

Table 1

| Element | Deposition potential (V) |
|---------|--------------------------|
| Co | 0.52 – 0.80 |
| Ni | 0.70 – 0.90 |
| Cu | 0.91 – 1.20 |

Accordingly, it is practically impossible to electrodeposit a Ni-Cu-Co alloy from a plain aqueous solution of the sulfates.

Figure 2:
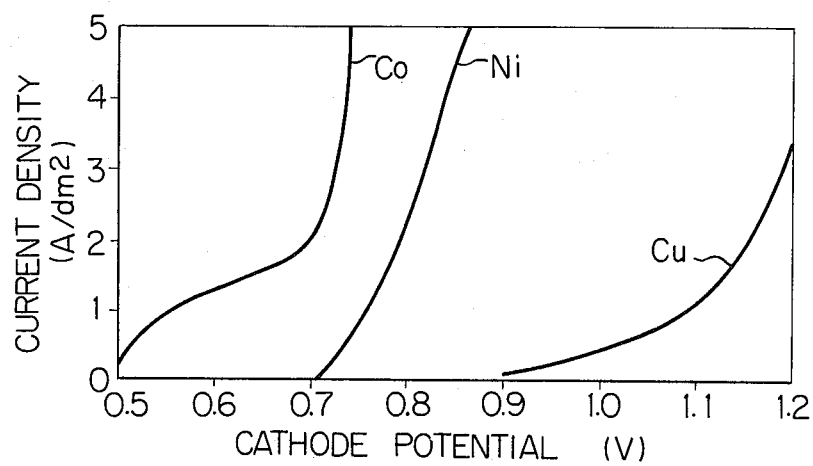
FIG. 2 is a graph showing the relationship between current density and deposition potential of nickel, copper and cobalt from an aqueous solution of sulfates of these metals.
Figure 3:
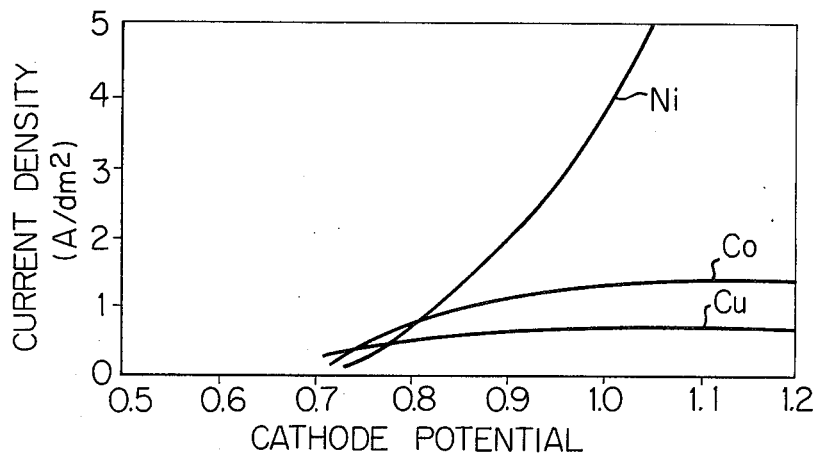
FIG. 3 is a similar graph for an aqueous solution containing a complexing agent in addition to the sulfates.

In a method of the invention, a complexing agent such as Rochell salt (potassium sodium tartrate), which causes ions in an electrolyte to form a complex, is added to an aqueous solution of nickel, copper and cobalt sufates. As a result of complex formation, deposition potentials of the component metals shift to a range common to the three metals. FIGS. 2 and 3 are presented to illustrate the effect of Rochell salt on deposition potentials of the above three metals from an aqueous solution containing 100 g/l of nickel (II) sulfate NiSO$_4$, 2.5 g/l of copper (II) sulfate CuSO$_4$ and 2.5 g/l of cobalt (II) sulfate CoSO$_4$. Deposition potentials of the respective metals were measured with respect to the standard hydrogen electrode potential. The results for the solution containing no complexing agent are shown in the graph of FIG. 2, wherein the three curves for the respective metals lie in potential ranges isolated from each other. When 32 g/l of Rochell salt was added to the solution, the deposition potentials changed remarkably as seen from the graph of FIG. 3. The three curves in FIG. 3 lie close to each other in a potential range approximately between 0.7 and 1.1 V, which is suitable for practical electrolysis.

Thus, a base metal can be electroplated with a Ni-Cu-Co alloy using a sulfate bath containing a complexing agent. Citric acid and ethylenediamine-tetraacetic acid (EDTA) also serve as the complexing agent in place of Rochell salt. According to the invention, an aqueous plating bath contains preferably 50 to 200 g/l of nickel (II) sulfate, 1 to 20 g/l of copper (II) sulfate, 1 to 20 g/l of cobalt (II) sulfate and 10 to 100 g/l of complexing agent. The bath may further contain usual addition agents such as boric acid for adjusting pH of the bath. The composition of the deposited alloy can be predetermined by varying the respective sulfate concentrations in the bath within the above preferred ranges. Any sulfate concentration below the above values will hinder the formation of an alloy of desired composition, and an excessively high concentration causes the resulting alloy to become defective in the adhesion and to lose luster.

The above described plating bath allows an ordinary base metal or carrier 11 for the catalyst 10 to be easily and inexpensively electroplated with a Ni-Cu-Co alloy 12 by usual electroplating procedures.

The invention will be further illustrated by the following examples.

EXAMPLE 1

An aqueous solution containing 100 g/l of $NiSO_4$, 5 g/l of $CuSO_4$, 3 g/l of $CoSO_4$, 32 g/l of Rochell salt and 10 g/l of boric acid was used as a plating bath. Electrolysis was carried out to plate an Inconel base metal using a current density of 5 $A/dm^2$ and a bath temperature of 55°C. The resulting cathode deposit was an alloy composed of 75% by weight Ni, 15% Cu and 10% Co.

Figure 4:
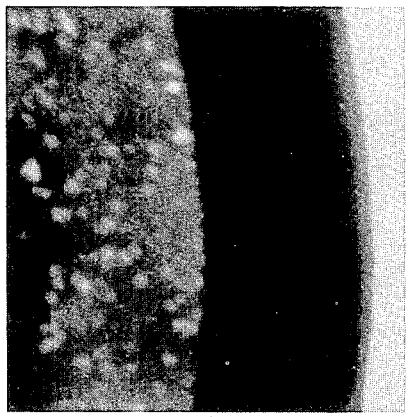
FIG. 4 is an X-ray photomicrograph showing sectionally a catalytic alloy layer electrodeposited on a base metal by a method of the invention.
Figure 6:
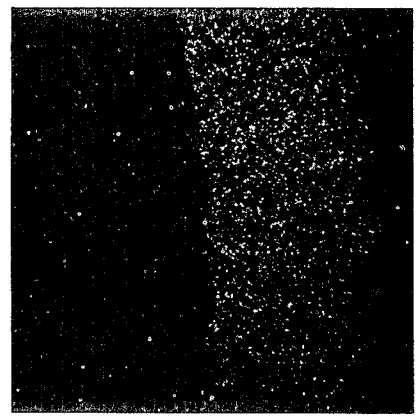
FIGS. 5, 6 and 7 are X-ray photomicrographs obtained by means of K$\alpha$ lines, showing the distribution of nickel, copper and cobalt, respectively, in the alloy layer of FIG. 4.
Figure 5:
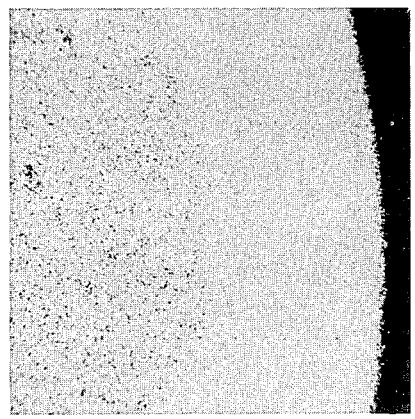
Figure 7:
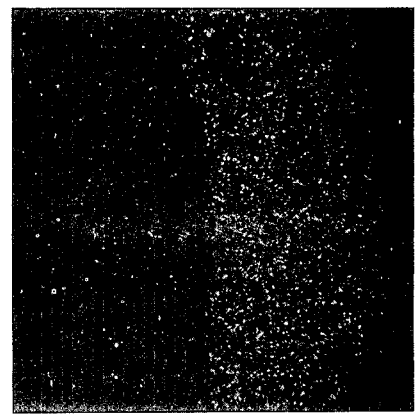

FIGS. 4–7 are X-ray photomicrographs of the deposited alloy. The photograph of FIG. 4 shows that an alloy layer (the dark region on the right side) is formed with good adhesion and in a uniform thickness on the base metal (the brighter region on the leftside). The photographs of FIGS. 5–7 were obtained by means of an X-ray $K\alpha$ line microscope to observe the distribution of the respective component elements in the alloy layer of FIG. 4. The white regions of FIGS. 5, 6 and 7 represent Ni, Cu and Co, respectively. These photographs verify that every component of the deposit is uniformly distributed and hence that the deposit is a real Ni-Cu-Co alloy.

EXAMPLE 2

A plating bath similar to that of Example 1 except that $CuSO_4$ and $CoSO_4$ were decreased to 2 g/l and 1 g/l, respectively, was employed. Electrolysis was carried out under the same conditions as in Example 1 using an Incoloy base metal. The cathode deposit was an alloy composed of 88% by weight Ni, 7% Cu and 5% Co.

EXAMPLE 3

Example 1 was repeated except that $CuSO_4$ and $CoSO_4$ were increased to 10 g/l and 5 g/l, respectively, and that the base metal was stainless steel of AISI type 316. The composition of the plated alloy was 60% by weight Ni, 20% Cu and 20% Co.

An experiment was carried out to examine the catalytic action of thus produced Ni-Cu-Co alloys. Various compositions of alloys were plated on several kinds of base metals in a manner similar to that used in the above examples, and the plated test pieces were exposed to an exhaust gas stream from an automobile engine, whose piston displacement was 1600 $cm^3$. For comparison, a test piece plated with a conventional Ni-Cu alloy was subjected to the same experiment.

The concentration of NOx in the exhaust gas stream was measured at two points, before and after contact with the test piece. From the measured NOx concentrations (NOx) in the exhaust gas, the conversion rate E was calculated by the following equation:

$$\frac{(NOx)_1 - (NOx)_2}{(NOx)_1} \times 100 = E\ (\%)$$

where the subscripts 1 and 2 represent the measuring points before and after the contact with the test piece, respectively. The experimental data obtained after the engine was operated for a period corresponding to 8000 miles (12900 km) running are presented in Table 2. The exhaust gas temperature around the test pieces were 700° to 800°C, and $(NOx)_1$ was about 500 ppm. All the test pieces including the one coated with a Ni-Cu alloy displayed initial E values of approximately 100 percent before the above endurance running.

Table 2

| Test Piece No. | Base Metal | Composition of Plated Alloy (Wt. %) | | | NOx Conversion Rate (%) |
|---|---|---|---|---|---|
| | | Ni | Cu | Co | |
| 1 | Inconel | 75 | 15 | 10 | 90 |
| 2 | | 90 | 2.5 | 7.5 | 90 |
| 3 | | 80 | 17.5 | 2.5 | 92 |
| 4 | | 88 | 7 | 5 | 91 |
| 5 | Incoloy | 95 | 2.5 | 2.5 | 90 |
| 6 | | 70 | 10 | 20 | 95 |
| 7 | Stainless Steel | 60 | 20 | 20 | 93 |
| 8 | (AISI | 72 | 8 | 20 | 90 |
| 9 | Type 316) | 75 | 20 | 5 | 92 |
| 10 | Nickel-Chomium Steel | 60 | 40 | — | 60 |

As seen from Table 2, the test pieces Nos. 1–9 plated with the ternary alloy functioned excellently as catalysts for reduction of NOx, exhibiting conversion rates of more than 90 percent irrespective of the alloy composition. These high values after the long operation prove the superior endurance of Ni-Cu-Co alloys compared with the known Ni-Cu alloy, which showed conversion rate of only 60 percent under the same conditions. Consequently, a Ni-Cu-Co alloy coating according to the invention is expected to serve as a strong and practical catalyst for reduction of NOx in exhaust gases from current internal combustion engines, especially those of automobiles. The strong catalytic action is expected to be retained even after the catalyst is used in an automobile for a distance of 25,000 miles (40,000 km).

What is claimed is:

1. A catalyst for contact reduction of oxides of nitrogen in an exhaust gas from an internal combustion engine, comprising a carrier made of a heat and corrosion-resistant metal and a coating of a catalytic alloy deposited on said carrier, said alloy consisting of 60 to 95% by weight nickel, 2.5 to 20% by weight copper and 2.5 to 20% by weight cobalt.

2. A catalyst according to claim 1, in which said heat and corrosion-resistant metal is selected from the group consisting of stainless steel, Ni-Cr alloys and Ni-Fe-Cr alloys.

3. A catalyst according to claim 1, in which said carrier is a net of said metal.

* * * * *